Dec. 10, 1929.  L. AZARRAGA  1,739,113
WINDING MEANS FOR MOTION PICTURE CAMERAS
Filed April 20, 1928
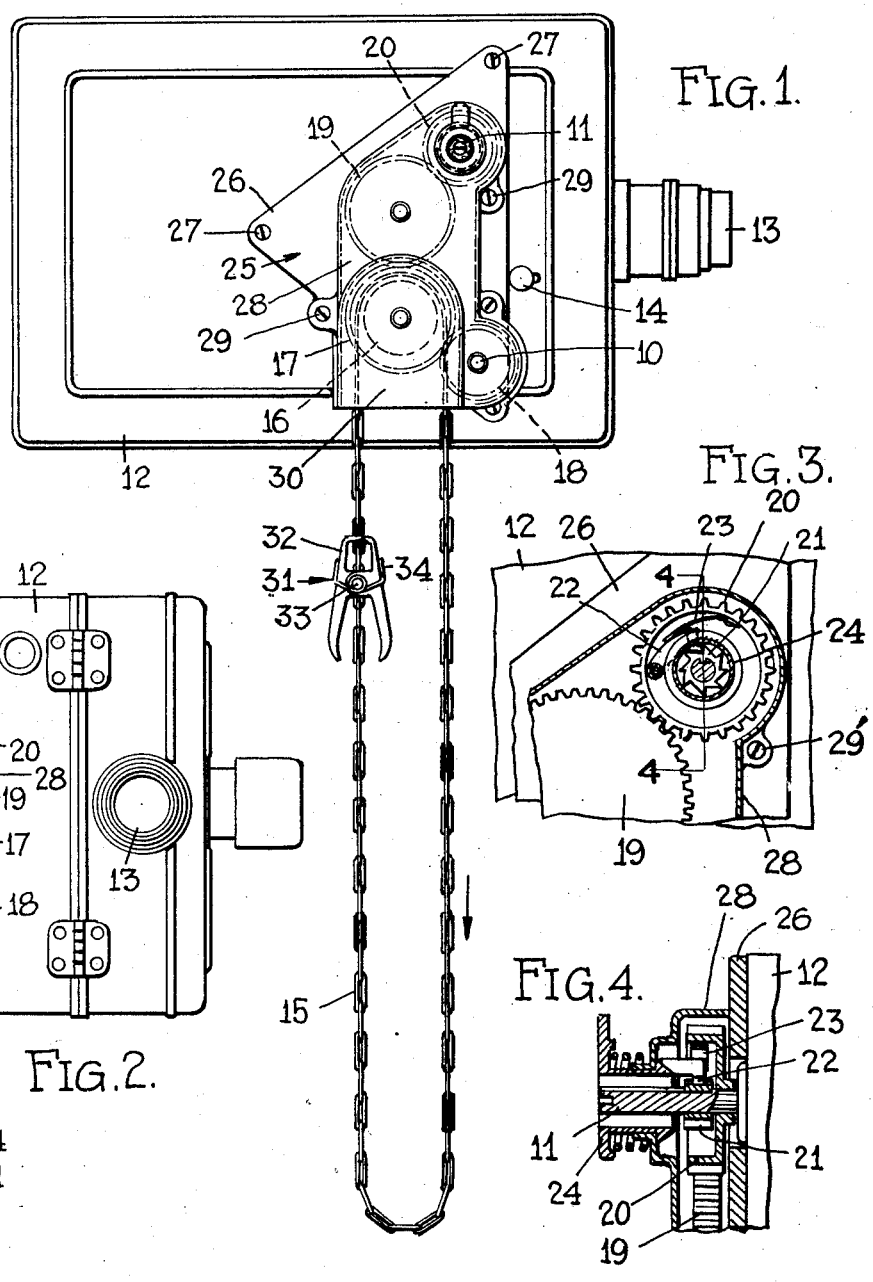
INVENTOR.
LUIS AZARRAGA.
BY
ATTORNEY.

Patented Dec. 10, 1929

1,739,113

UNITED STATES PATENT OFFICE

LUIS AZARRAGA, OF HEMPSTEAD, NEW YORK

WINDING MEANS FOR MOTION-PICTURE CAMERAS

Application filed April 20, 1928. Serial No. 271,435.

My invention relates to motion picture cameras.

An object of the invention is to provide in a motion camera an improved spring winding mechanism whereby the motor (usually a coil spring) can be wound or re-wound during and without interrupting the exposure of the usual one hundred and twenty-five or more feet of film.

A further object of the invention is to provide in lieu of the usual winding crank, which is detachable, and hence easily misplaced, an endless chain or the like which is permanently fastened to the camera box or casing.

A still further object of the invention is to provide a novel spring winding mechanism for motion picture cameras which can be conveniently and economically used on and attached to the camera case without altering or in any way harmfully affecting the usual case-contained camera operating mechanism.

Other and further objects and advantages of the invention will be hereinafter set forth.

In the drawings, wherein like reference characters denote like or corresponding parts, Fig. 1 is a side elevation of a motion picture camera with the device of my invention mounted thereon and fastened in place;

Fig. 2 is an end view;

Fig. 3 is a fragmentary view showing the pawl and ratchet mechanism associated with the camera cranking shaft, and Fig. 4 is section on the line 4—4 of Fig. 3.

In the embodiment of the invention selected for illustration a "De Vry standard automatic motion picture camera" is shown. It comprises in addition to the spring motor (not shown) a shaft 10 for winding the spring, a shaft 11 by means of which the camera mechanism is hand cranked, and a camera box or casing 12 within which the spring, the camera mechanism, and both shafts 10 and 11 are enclosed and from one end of which the lens mount 13 extends.

Without the device of my invention but fifty-five feet (approximately) of film can be exposed in a single operation notwithstanding the fact that the usual spool of film is anywhere from one hundred and twenty-five to one hundred and thirty-five feet in length. At the end of a fifty-five foot exposure the spring motor automatically stops and cannot again be set in motion without re-winding. To re-wind the spring a detachable hand crank has heretofore been used. By fitting this crank over the slotted end of the shaft 10 and cranking to the extent of approximately forty or more complete turns, the spring motor is again completely re-wound. Once re-wound the camera mechanism may again be set in motion by merely pressing the button or release lever 14 mounted at one side of the camera case. To expose the full length of film it has heretofore been necessary to stop and re-wind the spring at least twice.

By the present invention the necessity of stopping the automatic exposure of the film spool is avoided. Instead of a hand crank for re-winding the spring an endless chain 15, or the like, is provided. This chain 15 is carried throughout a portion of its length over a drum 16 either fastened to or formed as an integral part of a gear 17. Said gear 17 is in mesh with a smaller gear 18 mounted on the shaft 10, and is also in mesh with a gear 19 interposed between it and a second smaller gear 20 mounted on the shaft 11. By giving the chain 15 a pull, all of said gears 17, 18, 19, and 20, are simultaneously set in motion and at the same time the spring is re-wound thru the internal connection (not shown) between it and the shaft 10. According to the ratio of the gear train provided one or several pulls of the chain 15 is or are sufficient to completely re-wind the spring. No detachable hand crank, which might very easily become lost or replaced, is required.

The connection between the gear 20 and the shaft 11 is best illustrated in Fig. 3. Such a connection includes a ratchet 21 keyed to the shaft 11, a pawl 22 pivoted to the gear 20, and a leaf spring 23 fastened to said gear and bearing at its free end against the pawl 22 to hold it in engagement with said ratchet. Thus connected the shaft 11 and its associated ratchet are free to rotate in one direction by and as a result of the unwinding action of the spring (in which event the ratchet teeth merely ride over the free end of the pawl) and are made to rotate with the gear 20 in the same direction by and as a result of its rotation under the urge of the chain 15 when pulled. Accordingly it will be seen that the shaft 11 not only rotates when and during a film exposure, which is ordinarily the case, but also when and during a re-winding operation. As a motion picture camera of the character indicated is provided with an automatic governor by means of which the speed of rotation of the shaft 11 is controlled, said shaft, no matter how hard the chain 15 is pulled or jerked, cannot accelerate or operate beyond its intended speed. Thus organized a full exposure of the complete spool or film can be uninterruptedly carried out at one and the same predetermined speed of operation. To withdraw the pawl 22 out of engagement with the ratchet 21 in order that the spring may be re-wound without rotating the shaft 11, a trip 24 is provided. The shape of the casing 25 in which the gears 17, 18, 19, and 20 are enclosed, is best illustrated in Fig. 1. Said casing includes a triangular base plate 26 fastened as at 27 to the camera case, a casing proper 28 fastened as at 29 to said base plate, and an enlargement 30 shaped to receive the combination gear and drum unit 16—17. The latter casing part or enlargement 30 is provided with an opening or openings thru which the chain 15 is passed.

The trip 24 is best illustrated in Fig. 4. It comprises a sleeve-like plunger provided at its inner end with a bevel surface. This surface is in direct contact with a correspondingly formed surface projecting out from the pawl 22. Normally the trip 24 is held in the position indicated in said Fig. 4 by a spring encircling the sleeve-like plunger. When tripped this spring is compressed sufficiently to cause the inner beveled end of the sleeve-like plunger to withdraw the pawl 22 from engagement with the ratchet.

If it is desired to expose a length of film less than the complete spool, this fractional length can be approximately measured by means of an adjustable stop 31. The chain 15 is adapted to be pulled in the direction of the arrow of Fig. 1. At intervals of space along its length it is provided with colored links indicating a predetermined film footage. These links may be spaced to indicate units of twenty-five feet of film (more or less) as desired. By setting the stop at the twenty-five foot mark along the chain length and then pulling the chain until the stop is brought into engagement with the casing enlargement 30, the operator knows that the spring motor is wound and will unwind only sufficiently to admit of a twenty-five foot film exposure. As the spring motor unwinds the chain 15 moves at a corresponding speed in a direction opposite to that indicated by the arrow.

The construction of stop 31 is best illustrated in Fig. 1. It preferably comprises opposed gripping jaws 32, pivotally fastened one to the other as at 33 and spring spaced as at 34. When gripped by the hand of the operator, the jaws are separated against the action of the spring and the stop adjusted. When released, the jaws 32 again grip the chain to hold the stop in its adjusted position. Obviously, therefore, with the aid of the chain markings, provision is made for any length of film exposure less than the entire spool length.

A motion picture camera thus characterized, as intimated, is advantageous in that the spring motor may be re-wound at any time without interrupting a continuous film exposure. No hand crank for re-winding is required to be used. The entire length of film, or any fractional length thereof, can be exposed as desired. Moreover, since the winding mechanism is in its entirety housed as a unit, the device of my invention can be attached to and used on or in connection with motion picture cameras of standard make.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. The combination, with an automatic motion picture camera including a winding shaft and a shaft rotatable as the camera mechanism is set in motion, of winding mechanism manually operable to rotate said first mentioned shaft, and a connection between said winding mechanism and said second mentioned shaft for rotating the latter in the same direction as that induced by the camera mechanism during a winding operation.

2. The combination, with an automatic motion picture camera including a winding shaft and a shaft rotatable as the camera mechanism is set in motion, of an endless element operable to rotate said first mentioned shaft, and a connection between said first mentioned shaft and said second mentioned shaft, and operable by said element, for rotating said second mentioned shaft in the same direction as that induced by the camera mechanism during a winding operation.

3. The combination, with an automatic motion picture camera including a winding shaft and a shaft rotatable as the camera mechanism is set in motion, of an endless element operable to rotate said first mentioned shaft, and a gear connection between said first mentioned shaft and said second mentioned shaft, and operable by said element, for rotating said second mentioned shaft in the same direction as that induced by the camera mechanism during a winding operation.

4. The combination, with an automatic motion picture camera including a winding shaft and a shaft rotatable as the camera mechanism is set in motion, of a gear mounted on said first mentioned shaft, a gear in mesh with said first mentioned gear, a drum rotatable with said second mentioned gear, an endless element engaging with said drum for manually rotating said second mentioned gear and hence said first mentioned shaft, and a driving connection between said second mentioned gear and said second mentioned shaft for rotating the latter in the same direction as that induced by the camera mechanism during a winding operation.

5. The combination, with an automatic motion picture camera including a camera case, a winding shaft, and a shaft rotatable as the camera mechanism is set in motion, of winding mechanism manually operable to rotate said first mentioned shaft, a connection between said winding mechanism and said second mentioned shaft for rotating the latter in the same direction as that induced by the camera mechanism during a winding operaion, and a smaller casing fastened to and upon the exterior of said camera case within which said winding mechanism and said connection are enclosed.

6. The combination, with an automatic motion picture camera including a winding shaft and a shaft rotatable as the camera mechanism is set in motion; of an endless element having a driving connection with said first mentioned shaft for rotating the latter in a winding operation, said first mentioned shaft and hence said element being movable in a reverse direction as the camera mechanism is set in motion, a driving connection between said first mentioned shaft and said second mentioned shaft for rotating the latter in the same direction as that induced by said camera mechanism during a winding operation, and an adjustable stop mounted on said element for limiting the extent to which said first mentioned shaft can be wound.

7. The combination, with an automatic motion picture camera including a part rotatable as the camera mechanism is set in motion, of mechanism for winding the camera, and a connection between said winding mechanism and said rotatable part for rotating the latter in the same direction as that induced by the camera mechanism during a winding operation.

In testimony whereof I hereunto affix my signature.

LUIS AZARRAGA.